US007180962B2

(12) United States Patent
Chang et al.

(10) Patent No.: US 7,180,962 B2
(45) Date of Patent: Feb. 20, 2007

(54) APPARATUS AND METHOD FOR DEMODULATION USING DETECTION OF CHANNEL ADAPTIVE MODULATION SCHEME

(75) Inventors: Dae-Ig Chang, Daejon (KR); Nae-Soo Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 137 days.

(21) Appl. No.: 11/036,344

(22) Filed: Dec. 17, 2004

(65) Prior Publication Data

US 2005/0135507 A1 Jun. 23, 2005

(30) Foreign Application Priority Data

Dec. 19, 2003 (KR) ..................... 10-2003-0094013
Mar. 2, 2004 (KR) ..................... 10-2004-0014074

(51) Int. Cl.
*H04L 5/12* (2006.01)

(52) U.S. Cl. ...................................... 375/316; 375/324

(58) Field of Classification Search ................ 375/340, 375/341, 358, 324, 316
See application file for complete search history.

(56) References Cited

U.S. PATENT DOCUMENTS 6,614,851 B1 9/2003 Dehghan et al.
6,952,458 B1 * 10/2005 Djokovich et al. ......... 375/341
2002/0159536 A1 * 10/2002 Gelblum et al. ............ 375/265

FOREIGN PATENT DOCUMENTS

WO WO 01/99367 12/2001

OTHER PUBLICATIONS

"A Flexible Transmission Technique for the Satellite ISDB System"; H. Katoh, IEEE Transactions on Broadcasting, vol. 42, No. 3,Sep. 1996, pp. 159-166.

* cited by examiner

*Primary Examiner*—Emmanuel Bayard
(74) *Attorney, Agent, or Firm*—Blakely Sokoloff Taylor & Zafman

(57) ABSTRACT

An apparatus and a method for demodulation using detection of channel adaptive modulation scheme are disclosed. The apparatus includes: a receiving unit for receiving a signal modulated based on the channel adaptive modulation scheme from an external; a demodulating unit for demodulating the modulated signal according to modulation scheme information; a modulation scheme detecting unit for determining modulation scheme information by detecting mapping information from the demodulated signal and outputting the modulation scheme information to the demodulating unit; and a decoding unit for performing an error correction on the demodulated signal and decoding the demodulated signal by using the determined modulation scheme information.

7 Claims, 6 Drawing Sheets

RADIO FREQUENCY RECEIVER
FIRST DEMODULATOR
SECOND DEMODULATOR
NTH DEMODULATOR
FIRST DECODER
SECOND DECODER
NTH DECODER
FIRST ERROR DETECTOR
SECOND ERROR DETECTOR
NTH ERROR DETECTOR
DATA SELECTING UNIT
SELECTION SIGNAL
RECEIVING DATA
21
22
231
232
233
241
242
243
251
252
253
26
n 301
302
RADIO FREQUENCY RECEIVER
303
DEMODULATOR
z(k)
d(k)
304
MODULATION SCHEME DETECTOR
MODULATION TYPE INFORMATION
305
DECODER
n
RECEIVING DATA

APPARATUS AND METHOD FOR DEMODULATION USING DETECTION OF CHANNEL ADAPTIVE MODULATION SCHEME

FIELD OF THE INVENTION

The present invention relates to an apparatus and a method for demodulation using detection of channel adaptive modulation scheme; and, more particularly, to an apparatus and a method for demodulating a RF signal adaptively modulated according to a state of a transmission channel with using single demodulation unit by directly detecting a modulation scheme from a demodulated signal without receiving the modulation scheme information from a transmitter.

DESCRIPTION OF RELATED ARTS

In a wireless communication system, a state of transmission channel is variable and thus, a quality of transmitting signal is also variable. In case of a satellite communication, a radio frequency has been used for transmitting a signal since a limitation of frequency resource and a requirement of a broadband communication. Therefore, the transmitting signal may be seriously attenuated according to a precipitation and scintillation and a communication may be occasionally interrupted. Accordingly, an M-ary modulation scheme is adaptively determined according to a state of transmission channel.

For example, a large M-ary is determined in case of the state of the transmission channel is appropriate and a small M-ary is determined in case of the quality of the transmission channel is bad for appropriately maintaining the quality of the transmitting signal. However, it is impossible to demodulate the transmitting signal without exact information of modulation scheme at a receiver although the receiver receives a high quality signal. Accordingly, the receiver implemented with a channel adaptive modulation scheme requires the information of modulation scheme.

In a conventional wireless communication system, a transmitter must transmit the information of a modulation scheme or an error correction coding scheme to a receiver for channel adaptive transmission, or the transmitter transmits a signal by using a fixed modulation scheme or a fixed error correction coding scheme. Therefore, the transmitter and the receiver of the conventional wireless communication system have been getting complicated and ineffective.

FIG. 1 is a diagram illustrating a conventional modulation scheme transmitting adaptive modulator and demodulator.

As shown in FIG. 1, in the conventional modulation scheme transmitting adaptive modulator and demodulator, modulation scheme information 103 is periodically inserted in a frame 101 in front of a transmitting data 102 and the frame 101 with the modulation scheme information 103 is transmitted to a receiver.

The modulation scheme information 103 is transmitted based on a binary phase shifting keying (BPSK) scheme for guaranteeing a high quality of transmission.

Also, as shown in FIG. 1, a conventional demodulator includes a radio frequency receiver 111 for processing a wireless signal received from an antenna 110; a modulation scheme detection demodulator 112 for detecting M-ary information and a coding rate signal information based on the modulation scheme information included in the frame 101; a data demodulator 113 for demodulating the received wireless signal based on the modulation scheme information transmitted from a transmitter by detecting the M-ary information from the modulation scheme detection demodulator 112; and a decoder 114 for decoding a demodulated data from the data demodulator 113 based on the coding rate signal information from the modulation scheme detection demodulator 112.

As mentioned above, the conventional modulation scheme transmitting adaptive modulator periodically inserts the modulation scheme information into the frame and transmits the frame with the modulation scheme information to the receiver. Accordingly, bandwidth of the transmission channel is not effectively used and the system is complicated since the system must include additional modulator for transmitting the modulation scheme information in order to guarantee high quality transmission of the modulation scheme information.

FIG. 2 is a conventional multi-adaptive demodulator.

As shown in FIG. 2, the conventional multi-adaptive demodulator includes a radio frequency receiver 22 for processing a radio frequency (RF) signal received from an antenna 21; a plurality of demodulators 231 to 233 for demodulating the received RF signal to generate N demodulated data according to each of modulation schemes which are possibly used in a transmitter for modulating the RF signal; a plurality of decoders 241 to 243 for decoding N demodulated data; a plurality of error detector 251 to 253 for detecting a data path of each of decoded data from the decoders without error; and a data selection unit 26 for receiving the decoded data without error and a selection signal from the error detectors 251 to 253 and selecting one of decoded data as a receiving data among decoded data based on the selection signal.

As mentioned above, a transmitter of the conventional multi-adaptive demodulator does not require additional modulation device for transmitting the modulation scheme information to the conventional multi-adaptive demodulator in a receiver in order to guarantee the high quality transmission of the modulation scheme information. Therefore, the bandwidth of the transmission channel is effectively used in the communication system using the conventional multi-adaptive demodulator. However, the conventional multi-adaptive demodulator is very complicated since the conventional multi-adaptive demodulator must include a plurality of the demodulators 231 to 233, a plurality of the decoders 241 to 243 and a plurality of the error detectors 251 to 253 for demodulating the received RF signal based on all possible modulation schemes used in the transmitter.

For overcoming the above mentioned disadvantages, many scientists have been studied a method for transmitting the modulation scheme information to a receiver by using additional transmission channel. The method may eliminate the disadvantage of conventional system such as the bandwidth increase and the complexity of the conventional system. However, a data loss may be generated by a delay of information transmission and it requires additional transmission channel to transmit the modulation scheme information.

SUMMARY OF THE INVENTION

It is, therefore, an object of the present invention to provide an apparatus and a method for demodulation using detection of a channel adaptive modulation scheme by directly detecting a modulation scheme from a demodulated signal without receiving the modulation scheme information from a transmitter and without including a plurality of demodulation units.

In accordance with an aspect of the present invention, there is provided a demodulator using detection of a channel adaptive modulation scheme, the demodulator, including: a receiving unit for receiving a signal modulated based on the channel adaptive modulation scheme from an external; a demodulating unit for demodulating the modulated signal according to modulation scheme information; a modulation scheme detecting unit for determining modulation scheme information by detecting mapping information from the demodulated signal and outputting the modulation scheme information to the demodulating unit; and a decoding unit for performing an error correction on the demodulated signal and decoding the demodulated signal by using the determined modulation scheme information.

In accordance with an aspect of the present invention, there is also provided a method for demodulating by using detection of a channel adaptive modulation scheme, the method including the steps of: a) receiving a signal modulated by the channel adaptive modulation scheme; b) demodulating the modulated signal according to modulation scheme information; c) determining the modulation scheme information by detecting mapping information from the demodulated signal and feedbacking the determined modulation scheme; and d) error-correcting and decoding the demodulated signal by using the determined modulation scheme.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Figure 1:
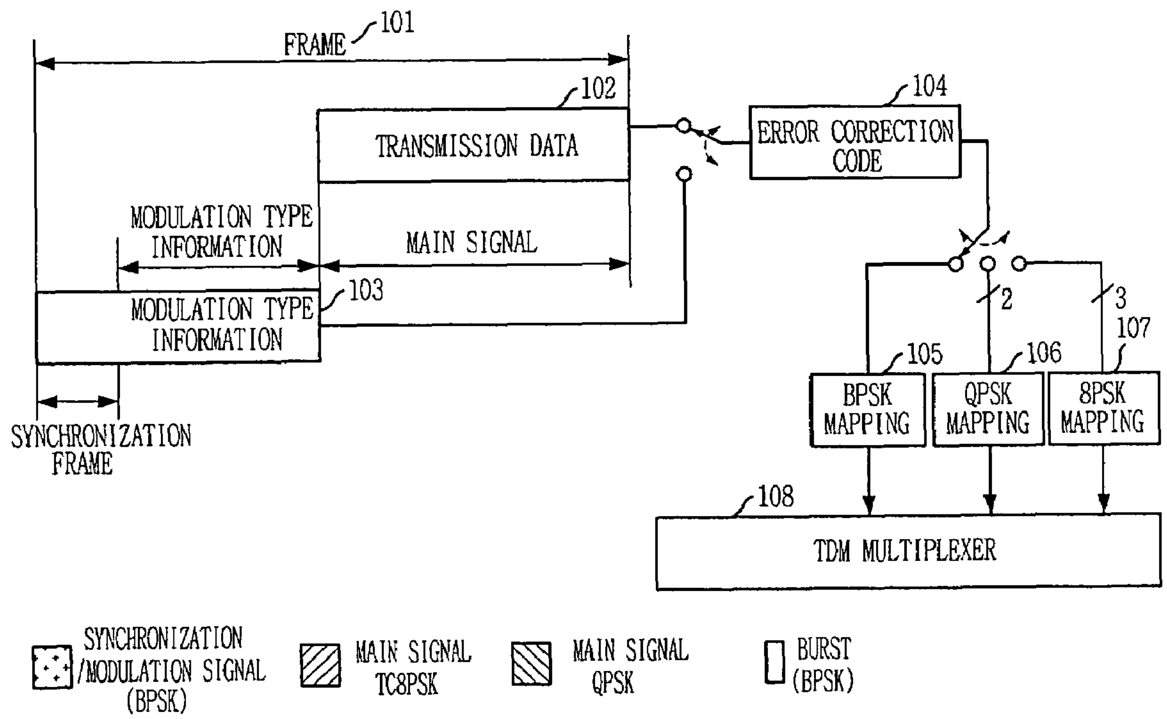
FIG. 1 is a diagram illustrating a conventional modulation scheme transmitting adaptive modulator and demodulator.
Figure 1:
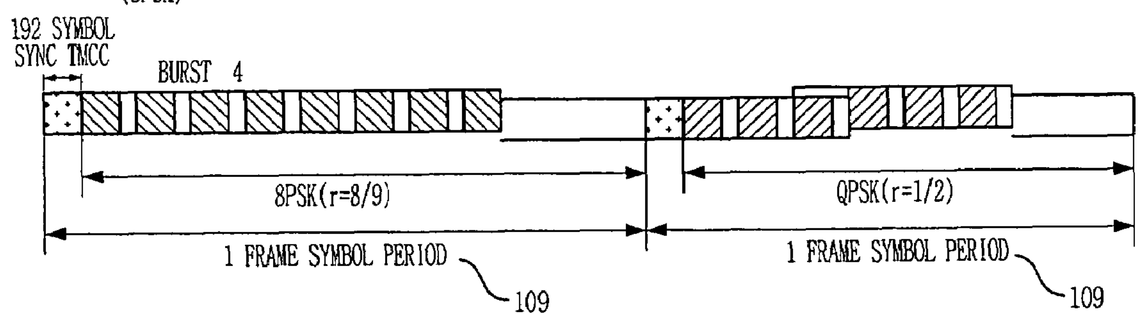
Figure 1:
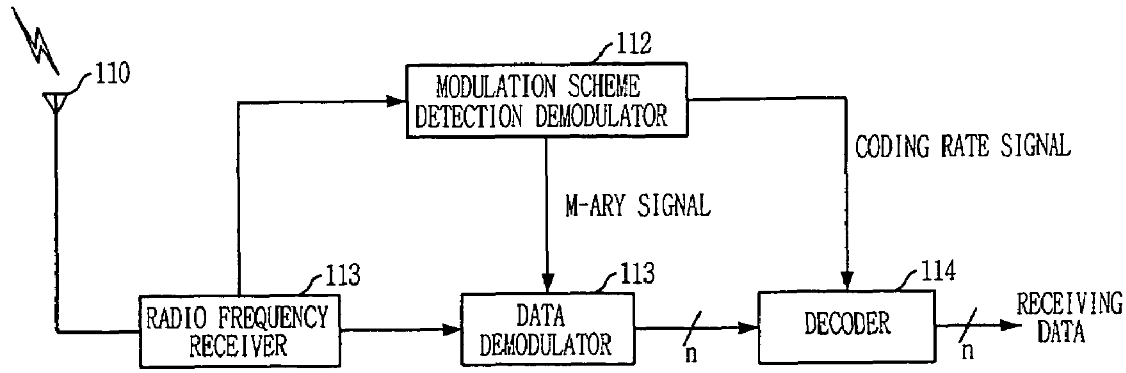
Figure 2:
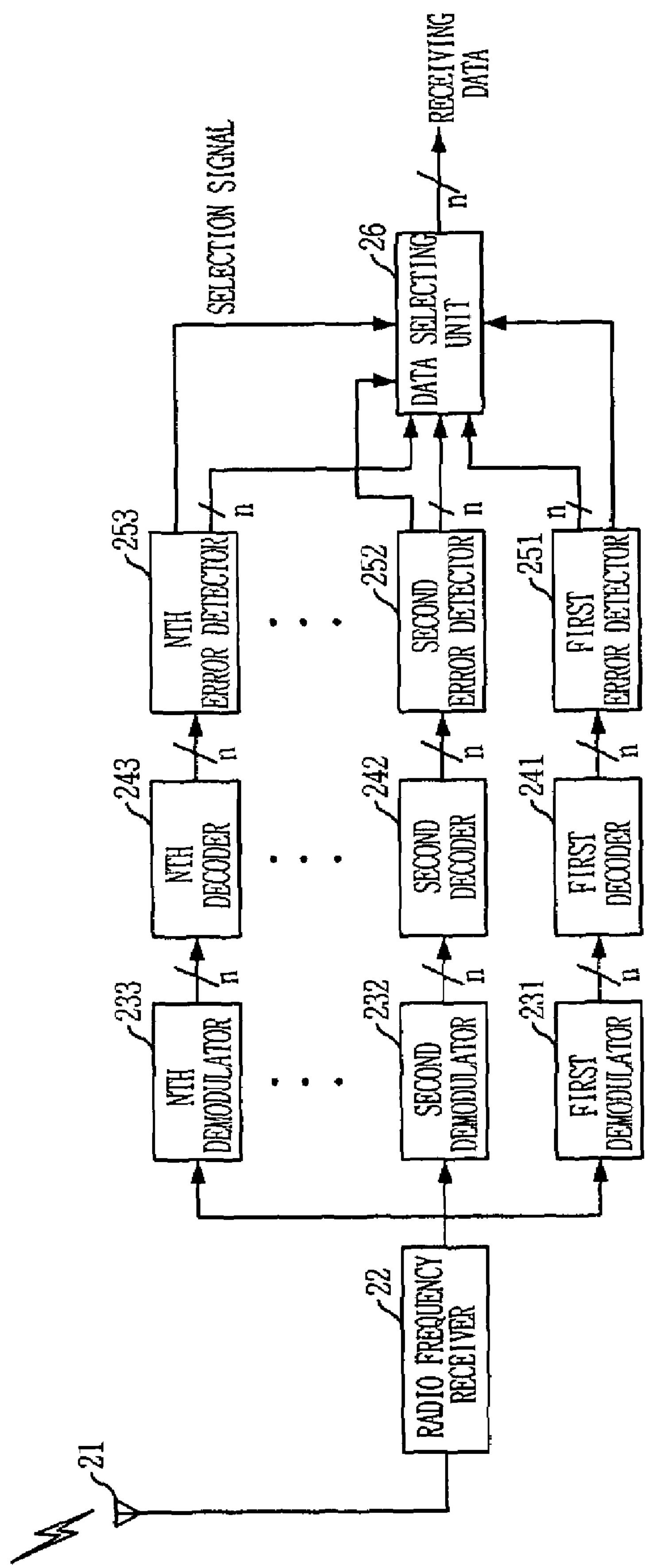
FIG. 2 is a conventional multi-adaptive demodulator.

In a digital modulation scheme, a signal is transmitted by converting one or combination of a carrier wave's a phase, amplitude or a frequency to digital data of 0 or 1. A phase shift keying (PSK) is a modulation scheme for transmitting a signal. In the PSK modulation scheme, the signal is transmitted by mapping a predetermined sign to a phase variation.

A binary PSK (BPSK) is a fundamental PSK modulation scheme and in the BPSK, a signal is transmitted by mapping two values (0 and 1) of digital signal to two phases (0 phase or $\pi$ phase).

In a quadrature PSK (QPSK), a signal is transmitted by combining two value (0 or 1) of the digital signal into 2 bit data and mapping the 2 bit data to four phases of the carrier wave. That is, the signal is transmitted by mapping 2 bit data (0.0) to 0 phase, 2 bit data (0.1) to $\pi/2$, 2 bit data (1.0) to $\pi$ phase, and 2 bit data (1.1) to $3\pi/2$ phase. Accordingly, the BPSK is commonly called as two phases shift keying modulation and the QPSK is commonly called as four phases sift keying modulation. Comparing to the BPSK, the QPSK modulated signal can transfer two times larger information in same frequency band and thus, the QPSK modulation is commonly used for transferring an audio signal of satellite broadcasting and for a satellite communication field.

Meanwhile, 8-PSK modulation scheme and 16-PSK modulation scheme have been also introduced. The 8 PSK modulation scheme transfer 8 time information and the 16 PSK modulation scheme transfers 16 times information comparing to the BPSK modulation scheme.

Hereinafter, an apparatus and a method for demodulating an adaptively modulated RF signal by directly detecting a modulation scheme from the RF signal without receiving the modulation scheme from a transmitter in accordance with a preferred embodiment of the present invention will be described in more detail with reference to the accompanying drawings.

Figure 3:
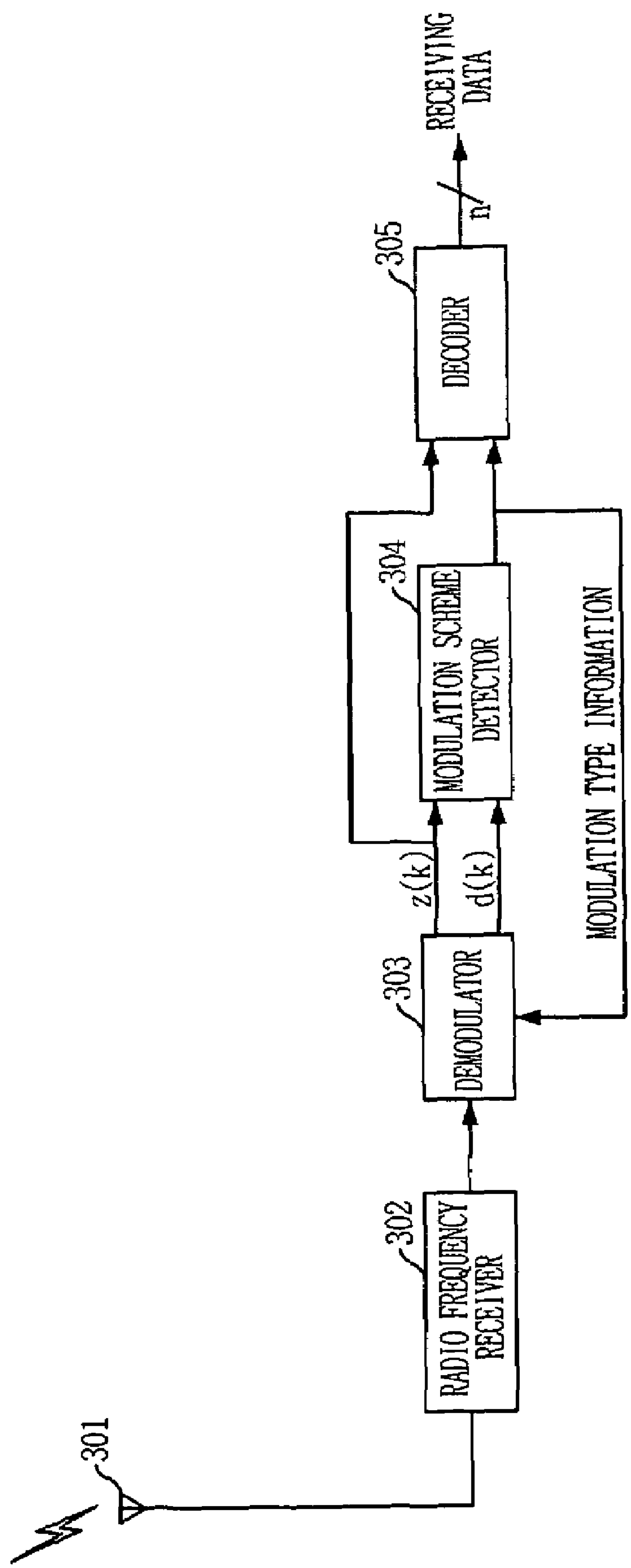
FIG. 3 is a diagram illustrating an apparatus for demodulating using a detection of a channel adaptive modulation scheme in accordance with a preferred embodiment of the present invention.

FIG. 3 is a diagram illustrating an apparatus for demodulating using a detection of a channel adaptive modulation scheme in accordance with a preferred embodiment of the present invention.

As shown in FIG. 3, the apparatus includes a radio frequency (RF) receiver 302, a demodulator 303, a modulation scheme detector 304 and a decoder 305.

The radio frequency (RF) receiver 302 receives a modulated signal from an antenna 301. The modulated signal is a signal adaptively modulated according to a state of transmission channel. That is, the modulated signal is modulated according to the channel adaptive modulation scheme.

The modulation scheme detector 304 receives a demodulated signal (z(k)) and a determined signal (d(k)) from a demodulator 303 and determines a modulation scheme of the modulated signal based on a mapping detection information. The modulation scheme detector 304 outputs the determined modulation scheme to the demodulator 303 and the decoder 305.

The demodulator 303 demodulates the modulated signal based on the determined modulation scheme from the modulation scheme detector 304 and outputs the demodulated signal (z(k)) to the modulation scheme detector 304 and the decoder 305. The demodulator 303 also generates the determined signal (d(k)) based on the demodulated signal (z(k)) and outputs the determined signal (d(k)) to the modulation scheme detector 304.

The decoder 305 receives a second demodulated signal (z(k)) from the demodulator 303 and the determined modulation scheme from the modulation scheme detector 304, performing an error correction and decodes the second demodulated signal (z(k)).

Figure 4:
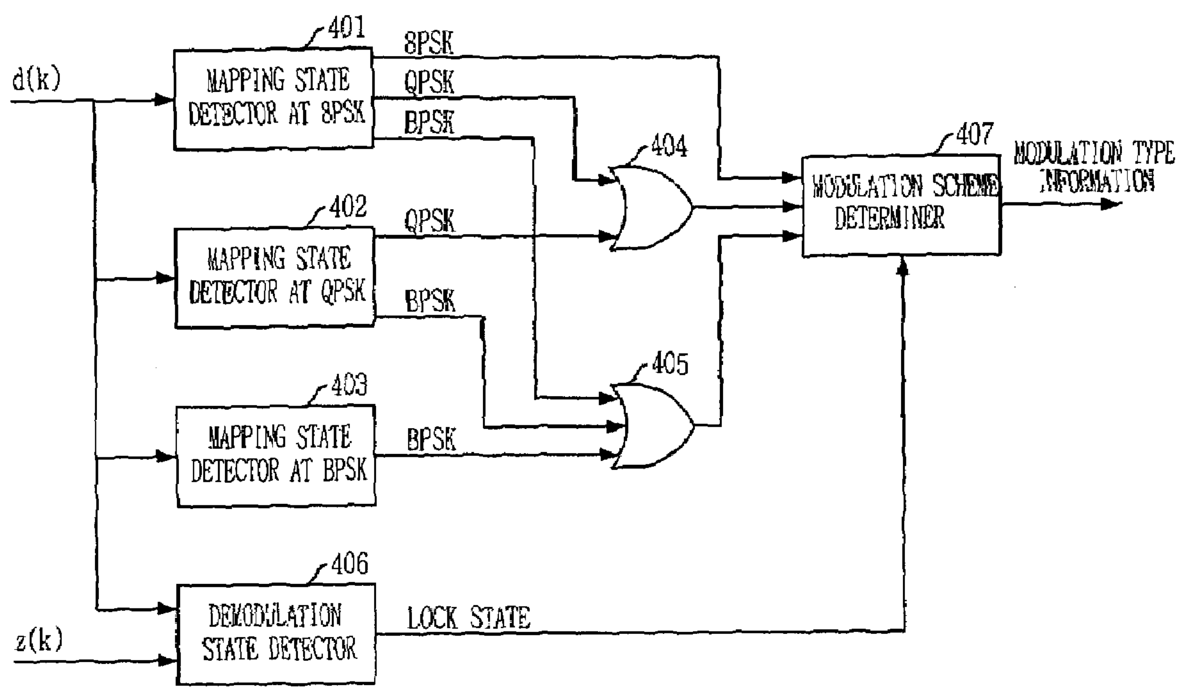
FIG. 4 is a detailed diagram illustrating the modulation scheme detector 304 in FIG. 3.

FIG. 4 is a detailed diagram illustrating the modulation scheme detector 304 in FIG. 3.

The modulation scheme detector 304 includes a 8PSK mapping state detector 401 meaning a mapping state detector at 8PSK, a QPSK mapping state detector 402 meaning a mapping state detector at QPSK, a BPSK mapping state detector 403 meaning a mapping state detector at BPSK, a first logical operator 404, a second logical operator 405, a demodulation state detector 406 and a modulation scheme determiner 407.

The 8PSK mapping state detector 401 receives the determined signal (d(k)) and detects a mapping signal in an 8PSK, QPSK or BPSK constellation.

The QPSK mapping state detector 402 receives the determined signal (d(k)) and detects a mapping signal in a QPSK or BPSK constellation.

The BPSK mapping state detector 401 receives the determined signal (d(k)) and detects a mapping signal in a BPSK constellation.

The first logical operator 404 receives the QPSK mapping signal from the 8PSK mapping state detector 401 and the QPSK mapping signal from the QPSK mapping state detector 402 and generates a first selection information for selecting a QPSK modulation scheme.

The second logical operator 405 receives the BPSK mapping signal from the 8PSK mapping state detector 401, the BPSK mapping signal from the QPSK mapping state detector 402 and the BPSK mapping signal from the BPSK mapping state detector 403 and selects a BPSK, and generates a second selection information for selecting a BPSK modulation scheme.

The demodulation state detector 406 receives the demodulated signal (z(k)) and the determined signal (d(k)) from the demodulator 303 and detects a state of demodulation.

The modulation scheme determiner 407 receives the 8PSK mapping signal from the 8PSK mapping state detector 401, the first and the second selection information from the first and the second logical operators 404, 405 and the detected state of demodulation from the demodulation state detector 406, and determines the modulation scheme of the modulated signal based on the received signals.

Following table shows modulation schemes which are possible to demodulate in each demodulator.

TABLE 1 a state of demodulator according to modulation scheme

| Demodulator Modulation scheme | BPSK | QPSK | 8PSK |
|---|---|---|---|
| BPSK | ○ | ○ | ○ |
| QPSK | X | ○ | ○ |
| 8PSK | X | X | ○ |

○: possible to demodulation
X: impossible to demodulation

As shown in Table. 1, M-PSK demodulator can demodulate a signal modulated by using M-PSK modulation scheme wherein the M and N are positive integers and M is greater than N. That is, 8-PSK demodulator can demodulate signals modulated by using 8-PSK, QPSK and BPSK modulation schemes. Also, the QPSK demodulator can demodulate signals modulated by using QPSK and BPSK modulation schemes.

The modulation scheme detector uses the above mentioned fundamental concept.

The 8PSK, QPSK and BPSK mapping state detector 401, 402 and 403 accumulate constellation points from 2-dimensional determined signal (d(k)) within a predetermined time and obtain a constellation location information.

The 8PSK mapping state detector 401 determines a decision boundary under assumptions of existence of 8 constellation points and locations of 8 constellation points, detects a current constellation location of the determined signal (d(k)) within the decision boundary and accumulates the current constellation locations within t3 symbols. After accumulating, the 8PSK mapping state detector 401 detects a modulation scheme based on the accumulated current constellation locations within t3 symbols.

That is, the accumulated current constellation locations are counted when the constellation location is detected within the t3 symbols. If the counting number is greater than a predetermined threshold value, it determines that a corresponding modulation scheme is detected (lock) and if not, it determines that detection of the corresponding modulation scheme is failed (unlock). When the counting number is greater than the predetermined threshold value, if the accumulated constellation locations are arranged in all eight locations of 8PSK constellation points, then 8PSK modulation scheme mode is determined. If the accumulated constellation locations are arranged in four locations of QPSK constellation points, the QPSK modulation scheme mode is determined. Also, if the accumulated constellation locations are arranged in two locations of BPSK constellation points, the BPSK modulation scheme mode is determined. The determined modulation scheme mode is provided to the modulation scheme determiner 407 and the modulation scheme determiner 407 determines appropriately based on the determined modulation scheme mode.

The QPSK mapping state detector 402 determines a decision boundary under assumptions of existence of 4 constellation points and locations of 4 constellation points in a QPSK modulation state, detects a current constellation location of the determined signal (d(k)) within the decision boundary and accumulates the current constellation locations within t2 symbols. After accumulating, the QPSK mapping state detector 402 detects a modulation scheme based on the accumulated current constellation locations within t2 symbols.

That is, the accumulated current constellation locations are counted when the constellation location is detected within the t2 symbols. If the counting number is greater than a predetermined threshold value, it determines that a corresponding modulation scheme is detected (lock) and if not, it determines that detection of the corresponding modulation scheme is failed (unlock). When the counting number is greater than the predetermined threshold value, if the accumulated constellation locations are arranged in all four locations of QPSK constellation points, then QPSK modulation scheme mode is determined. Also, if the accumulated constellation locations are arranged in two locations of BPSK constellation points, the BPSK modulation scheme mode is determined. The determined modulation scheme mode is provided to the modulation scheme determiner 407 and the modulation scheme determiner 407 determines appropriately based on the determined modulation scheme mode.

The BPSK mapping state detector 403 determines a decision boundary under assumptions of existence of two constellation points and locations of two constellation points in a BPSK modulation state, detects a current constellation location of the determined signal (d(k)) within the decision boundary and accumulates the current constellation locations within t1 symbols. After accumulating, the BPSK mapping state detector 401 detects a modulation scheme based on the accumulated current constellation locations within t1 symbols.

That is, the accumulated current constellation locations are counted when the constellation location is detected within the t1 symbols. If the counting number is greater than a predetermined threshold value, it determines that a corresponding modulation scheme is detected (lock) and if not, it determines that detection of the corresponding modulation scheme is failed (unlock). When the counting number is greater than the predetermined threshold value, if the accumulated constellation locations are arranged in all two locations of BPSK constellation points, then BPSK modulation scheme mode is determined. The determined modulation scheme mode is provided to the modulation scheme determiner 407 and the modulation scheme determiner 407 determines appropriately based on the determined modulation scheme mode.

Meanwhile, if the transmitter changes a modulation scheme, the receiver losses a carrier wave synchronization and have high noise amplitude. Accordingly, the modulation scheme determiner 407 requires tracing a changed modulation scheme from the received signal. The demodulation state detector 406 detects a noise amplitude caused by change of the modulation scheme and generates a demodulation state information. By using the demodulation state information from the demodulation state detector 406, the modulation scheme determiner 407 may provides a highly stabilized result for determining the modulation scheme.

The modulation scheme determiner 407 determines the modulation scheme by receiving the mapping information from the 8PSK, the QPSK and the BPSK mapping state detectors 401 to 403 and the demodulation state information from the demodulation state detector 406.

The 8PSK mapping state detector 401 can detect modulation schemes of 8PSK, QPSK and BPSK modulation schemes. However, the QPSK mapping state detector 402 can detect modulation schemes of QPSK and BPSK modulation schemes. Also, the BPSK mapping state detector 401 can detect only BPSK modulation scheme. Accordingly, the modulation scheme is determined by using all selection signals from the 8PSK, the QPSK and the BPSK mapping state detectors 401 to 403.

Detection of 8PSK modulation scheme is only possible to the 8PSK mapping state detector 401. However, the QPSK modulation scheme can be determined at the 8PSK mapping state detector 401 and the QPSK mapping state detector 402. Therefore, the detection information (qpsk_det) of QPSK modulation scheme is determined by using following Eq. 1 based on the information from the 8PSK mapping state detector 401 and the QPSK mapping state detector 402. Herein the QPSK modulation detection information (qpsk_det) is determined when a QPSK state detection information ($qpsk_8$) from the 8PSK mapping state detector 401 and a QPSK state detection information ($qpsk_q$) from the QPSK mapping state detector 402 are received under the lock state (lock) is maintained by the demodulation state detector 406.

$$qpsk\_det=[qpsk_8\lceil(qpsk_q\ \mathrm{lock})]\overline{8psk^8} \quad \text{Eq. 1}$$

The BPSK modulation scheme can be determined at the 8PSK, the QPSK and the BPSK mapping state detector 401 to 403. Therefore, the detection information (bpsk_det) of BPSK modulation scheme is determined by using following Eq. 2 based on the information from the 8PSK, the QPSK and the BPSK mapping state detector 401 to 403. Herein the BPSK modulation detection information (bpsk_det) is determined when a BPSK state detection information (qpsk8) from the 8PSK mapping state detector 401, a BPSK state detection information ($bpsk_q$) from the QPSK mapping state detector 402 and a BPSK state detection information ($bpsk_b$) are received under the lock state (lock) is maintained by the demodulation state detector 406.

$$bpsk\_det=bpsk_8\lceil bpsk_q\lceil(bpsk_b lock)(\overline{8psk_8}\lceil\overline{qpsk_8}\lceil\overline{qpsk}) \quad \text{Eq. 2}$$

Figure 5:
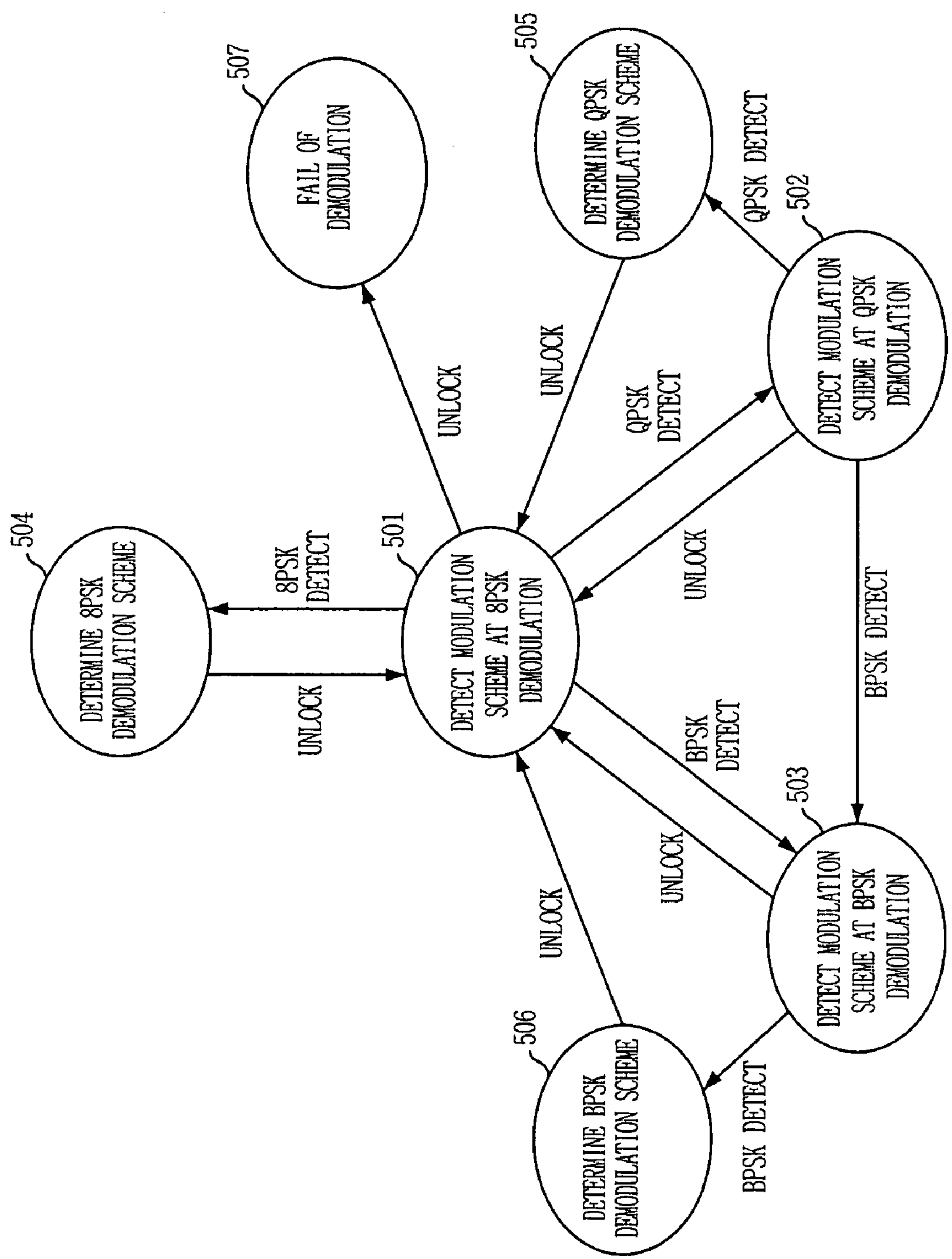
FIG. 5 is a state diagram showing a method for demodulating using a detection of a channel adaptive modulation scheme in accordance with a preferred embodiment of the present invention.

FIG. 5 is a state diagram showing a method for demodulating using a detection of a channel adaptive modulation scheme in accordance with a preferred embodiment of the present invention.

As shown in FIG. 5, it is possible to detect all modulation schemes 8PSK, QPSK and BPSK in 8PSK demodulation of a modulation scheme detection state 501. A demodulation scheme is determined according to detected modulation scheme at states 501 to 503 and reliability is increased by determining a modulation scheme after demodulation at states 504 to 506. Meanwhile, a fail of demodulation is noticed at state 507 in case of unlock state which represents impossible of demodulation.

It is possible to detect QPSK and BPSK modulation schemes in QPSK demodulation of a modulation scheme detection state 502. A demodulation scheme is determined according to detected modulation scheme at states 502 to 503 and the modulation scheme is determined after demodulation at states 505 to 506. In case of fail of detection (unlock), the modulation scheme detection state 501 in 8PSK demodulation is selected.

In a modulation scheme detection state 503 in the BPSK demodulation, only a signal modulated by a BPSK modulation scheme can be demodulated. A BPSK demodulation scheme is selected according to detected modulation scheme at state 503 and the modulation scheme is determined after demodulation at state 506. In case of fail of detection (unlock), the modulation scheme detection state 501 in 8PSK demodulation is selected.

Figure 6:
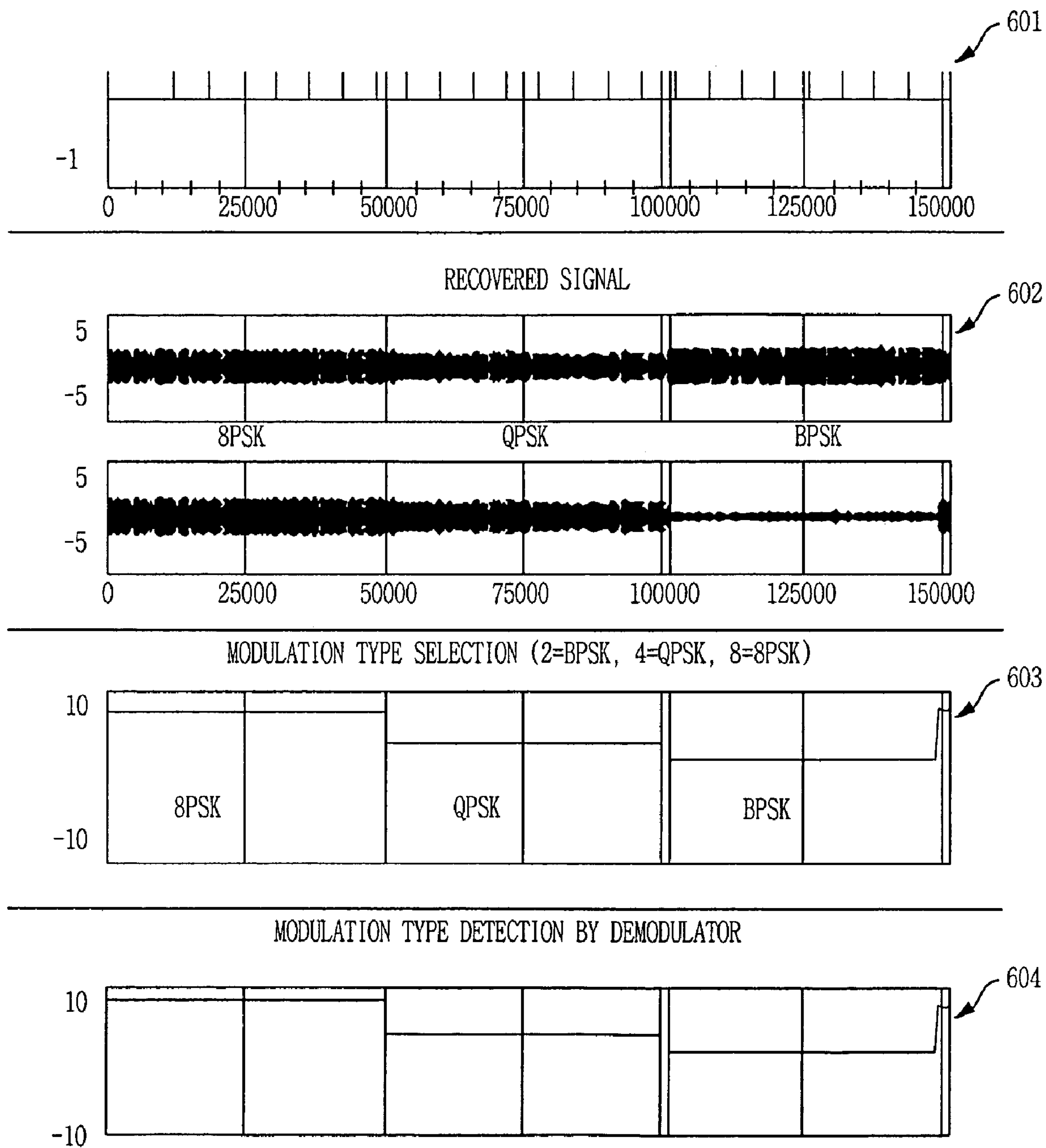
FIG. 6 is a graph showing a detection wave form according to variation of modulation schemes in accordance with a preferred embodiment of the present invention.

FIG. 6 is a graph showing a detection wave form according to variation of modulation schemes in accordance with a preferred embodiment of the present invention. The graph of FIG. 6 shows a simulation result of signal wave form demodulated according to selected modulation scheme.

A modulator modulates a signal based on 8PSK, QPSK and BPSK according to a control signal 603 within 50,000 sample units and a demodulator receives the modulated signal. The demodulator 303 outputs a demodulated signal 602 and a frame synchronization 601 detected from the demodulated signal.

As a result of a simulation of detecting the modulation scheme from the demodulated signal 602, the changed modulation scheme is detected within 330 sample units (5.16 us) after changing the modulation scheme.

That is, the result of the simulation is exactly matched with the control signal 603 in the modulator. Accordingly, the graph shows the demodulation method of the present invention finds the changed modulation scheme very fast and demodulation scheme is adaptively changed according to the changed modulation scheme.

As mentioned above, the demodulator of the present invention can adaptively demodulate the RF signal modulated according to channel adaptive modulation scheme by directly detecting the modulation scheme from the demodulated signal without receiving the modulation scheme information from the transmitter. Therefore, additional modulation device for transmitting the modulation scheme information is not necessary to be included in the transmitter and it is not necessary to the receiver having a plurality of demodulators for all possible modulation schemes in the transmitter.

Furthermore, the efficiency of using bandwidth increases and additional transmission channel is not required in the demodulator of the present invention since the demodulator directly detects the modulation scheme used in the transmitter for modulating the signal according to a state of the transmission channel.

While the present invention has been described with respect to certain preferred embodiments, it will be apparent to those skilled in the art that various changes and modifications may be made without departing from the spirits and scope of the invention as defined in the following claims.

What is claimed is:

1. A demodulator using detection of a channel adaptive modulation scheme, the demodulator, comprising:

a receiving means for receiving a signal modulated based on the channel adaptive modulation scheme from an external;

a demodulating means for demodulating the modulated signal according to modulation scheme information;

a modulation scheme detecting means for determining modulation scheme information by detecting mapping information from the demodulated signal and outputting the modulation scheme information to the demodulating means; and a decoding means for performing an error correction on the demodulated signal and decoding the demodulated signal by using the determined modulation scheme information.

2. The demodulator as recited in claim 1, wherein the demodulating means demodulates the modulated signal based on the determined modulation scheme inputted from the modulation scheme detecting means; outputs the demodulated signal to the modulation scheme detecting means and the decoding means; and outputs a determined signal determined based on the demodulated signal to the modulation scheme detecting means, and wherein the modulation scheme detecting means detecting the mapping information by receiving the demodulated signal and the determined signal from the demodulating means; determines the modulation scheme based on the detected mapping information; and outputs the modulation scheme to the demodulating means and the decoding means.

3. The demodulator as recited in claim 2, wherein the modulation scheme detecting means includes: a plurality of mapping information detection means, each of which for receiving the determined signal from the demodulating means and detecting a mapping signal at each constellation point; a demodulation state detection means for receiving the demodulated signal and the determined signal from the demodulating means and detecting a demodulation state; and a modulation scheme determination means for determining the modulation scheme by receiving each of detected mapping signals from the plurality of mapping information detection means and the detected demodulation state from the demodulation state detection means.

4. The demodulator as recited in claim 3, wherein the plurality of the mapping information detection means includes: an 8PSK mapping state detector for detecting a mapping signal from 8PSK constellation points by receiving the determined signal from the demodulating means; a QPSK mapping state detector for detecting a mapping signal from QPSK constellation points by receiving the determined signal from the demodulating means; and a BPSK mapping state detector for detecting a mapping signal from BPSK constellation points by receiving the determined signal from the demodulating means.

5. The demodulator as recited in claim 4, wherein the modulation scheme determination means includes: a first logical operator for receiving a QPSK mapping signal from the 8PSK mapping state detector and a QPSK mapping signal from the QPSK mapping state detector, and selecting a QPSK modulation scheme; a second logical operator for receiving a BPSK mapping signal from the 8PSK mapping state detector, a BPSK mapping signal from the QPSK mapping state detector and a BPSK mapping signal from the BPSK mapping state detector, and selecting a BPSK modulation scheme; and a modulation scheme determiner for receiving a first selection information from the first logical operator and a second selection information from the second logical operator and the detected demodulation state information from the demodulation state means, and determining the modulation scheme based on the first selection information, the second selection information and the demodulation state information.

6. A method for demodulating by using detection of a channel adaptive modulation scheme, the method comprising the steps of:

a) receiving a signal modulated by the channel adaptive modulation scheme;

b) demodulating the modulated signal according to modulation scheme information;

c) determining the modulation scheme information by detecting mapping information from the demodulated signal and feedbacking the determined modulation scheme to the demodulating steps; and d) error-correcting and decoding the demodulated signal by using the determined modulation scheme.

7. The method as recited in claim 6, wherein the step c) includes:

c-1) detecting the mapping information by accumulating constellation points of a determined signal determined from the demodulated signal; and c-2) determining the modulation scheme corresponding to the detected mapping information when the detected mapping information is greater than a predetermined threshold value.

* * * * *